June 29, 1943.    A. URFER    2,323,166
ALTIMETER REGULATOR
Filed March 7, 1942    2 Sheets-Sheet 1

INVENTOR:
A. URFER
BY Morgan, Finnegan & Durham
ATTORNEYS

June 29, 1943.  A. URFER  2,323,166
ALTIMETER REGULATOR
Filed March 7, 1942  2 Sheets-Sheet 2
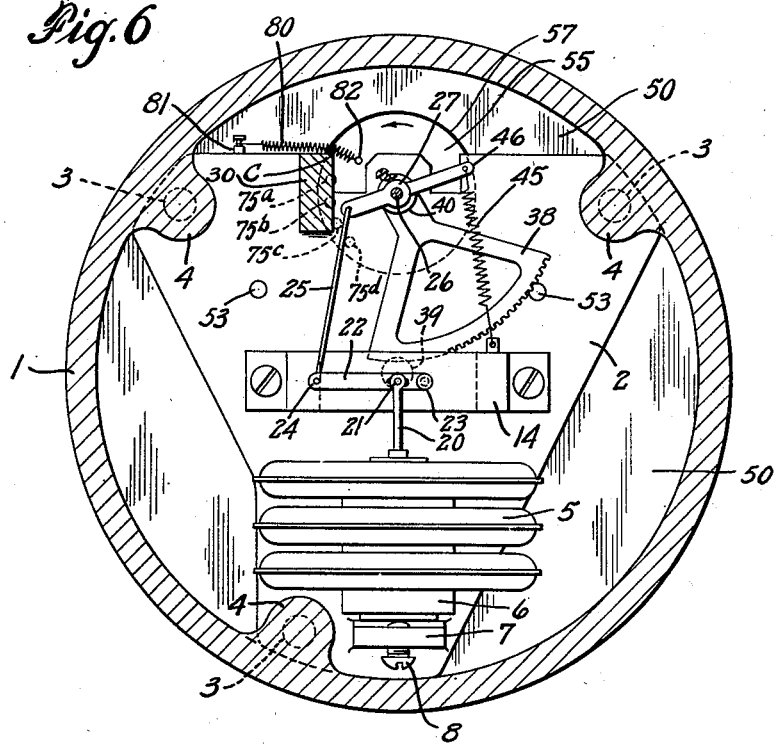
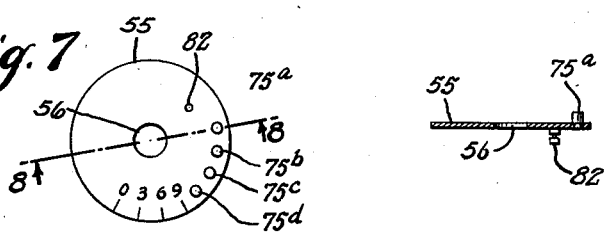
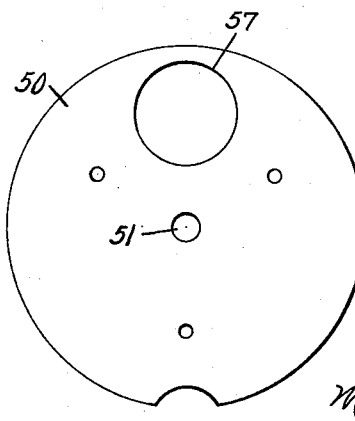
INVENTOR:
A. URFER
BY Morgan, Finnegan & Durham
ATTORNEYS Patented June 29, 1943

2,323,166

UNITED STATES PATENT OFFICE 2,323,166

ALTIMETER REGULATOR

Adolf Urfer, New Rochelle, N. Y.

Application March 7, 1942, Serial No. 433,759

5 Claims. (Cl. 73—4)

This invention relates to altimeters for aircraft.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 6 is a section on line 6—6 of Fig. 3;

Fig. 7 is a detail plan view of the smaller dial;

Fig. 8 is a section on line 8—8 of Fig. 7; and

Fig. 9 is a detail plan view of the face plate.

Figure 1:
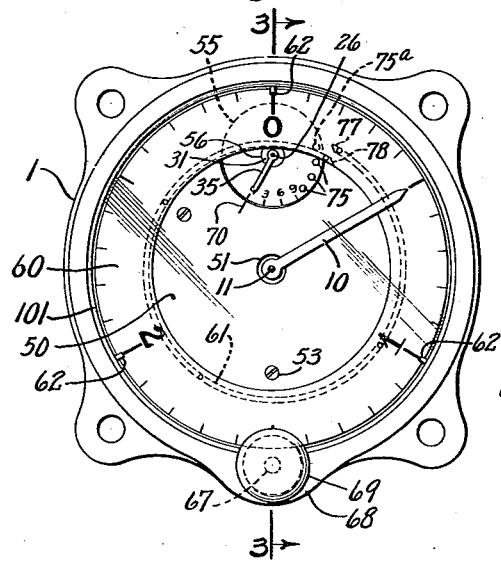
Fig. 1 is a front elevation of an altimeter embodying the invention, showing the zero setting of the dials.

Objects of the invention are to provide an improved barometric altimeter having means for manually setting in advance the altitude of the intended landing field or the altitude of any other known spot so that the figures indicated by the altimeter will be those of the actual distance from the ground at such spot, thereby saving the pilot from having to make the necessary mental calculations on each observation of the instrument. Such manual or arbitrary settings or corrections are also desirable to compensate for changes in barometric pressures. The invention includes means for automatically registering and indicating zones of altitude beyond those in the range of the large scale dial so that the pilot will automatically be presented with visible indicia showing the actual altitude within ranges very much greater than that of the large scale graduations of the indicator dial. Another object of the invention is to maintain constant registration and coordination between the positions and indicia of the major indicating dial and the minor or small scale indicator so that the pilot can tell at a glance what his actual altitude may be regardless of any arbitrary or manual settings which have been applied to the instrument.

In connection with the latter object of the invention I provide a very simple mechanism for maintaining constant the ratios of movement between the two scales or dials, which means are very accurate and without any looseness or lost motion in the setting operations. Another feature of the invention is the provision of means for preventing mis-alignment of any of the scales or dials through inadvertent settings thereof in the wrong direction or opposite sense from that required for proper operation.

More particularly my invention provides means in a barometric altimeter for applying arbitrary or manual corrections to an altimeter scale or dial and for transferring such corrections automatically and in the proper ratio to a smaller scale indicator so that when the range of the major indicator scale has been exceeded by such arbitrary corrections, such excess movement will be automatically indicated on the smaller scale dial thereby providing the pilot with a constant record and indication of the actual amount of ground elevation subtracted from the barometric reading of the instrument. By this means the instrument can be set over a very large range of altitudes for giving true height readings from the ground which can be read directly from the altimeter.

It will be understood that the foregoing general description and the following detailed description as well are exemplary and explanatory but are not restrictive of the invention. Referring now in detail to the present preferred embodiment of the invention, illustrated by way of example in the accompanying drawings, a barometric altimeter of generally known construction is shown having a cylindrical cup-like outer casing 1 in which is vertically mounted a triangular main supporting bracket 2 by means of screws 3 formed in lugs 4 extending inwardly from the cylindrical wall of the casing. The front open face of the casing 1 is preferably sealed by a transparent closure such as the glass plate 100 which is held in place by the expanding split ring 101. A high-vacuum diaphragm or capsule 5 is mounted for vertical expansion and contraction within the casing, the bottom end 6 thereof being supported from the projecting bracket 7 of the main bracket 2. An adjusting screw 8 may be provided in said bracket 7 for compensating for seasoning of the diaphragm or warpage of the mechanism.

Means are provided for multiplying the motions from expansion and contraction of the capsule and for transmitting said multiplied motions to a pointer or other indicator in known manner. As embodied a pointer or hand 10 is mounted at the end of horizontal shaft 11, said pointer being adapted to be turned by said shaft in a vertical plane at the front of the altimeter. The front end of shaft 11 projects from a sleeve bearing bushing 12 formed in the main bracket 2. The shaft 11 projects rearwardly therefrom and its main end is supported in a smaller sized bearing bushing 13. The latter is supported in a rearwardly extending U-shaped bracket 14 which is mounted on the rear face of the main bracket 2.

The embodied means for transmitting vertical motion of the capsule 5 to rotate shaft 11 and pointer 10 at a multiplied rate comprises an upstanding arm 20 fixed to the upper surface of the capsule. The upper end of said arm 20 is pivotally connected at 21 to a pivoted cross-link 22, the short end of which is fulcrumed at 23, while the longer arm thereof is pivotally connected at its end 24 to an upwardly extending link 25. The latter is connected to transmit angular motion to the upper horizontal shaft 26 by means of a sleeve 27 which is attached to turn with said shaft and is provided with angularly extending arm 28 to which the upper end of link 25 is pivotally connected. The upper horizontal shaft 26 is journalled at its rear end by means of a sleeve bushing bearing 29 which is journalled in the rear wall of an L-shaped bracket 30 extending rearwardly from the rear face of the main bracket 2. The front end of shaft 26 is similarly mounted by means of sleeve bearing bushing 31 which is journalled in the main bracket 2. A pointer or hand 35 for indicating the relatively small angular motion of shaft 26 is mounted at the front end thereof and rotates in a vertical plane parallel to and inside that of the pointer 10.

The embodied means for transmitting multiplied rotary movement from shaft 26 to pointer shaft 11 comprises a geared segment 38, the peripheral teeth of which are positioned to engage a pinion 39 fixed on the shaft 11. Said segment is provided with a hub 40 sleeved on the shaft 26 and fixed to turn therewith by a set screw or other suitable means. Thus it will be evident that vertical movements of the expanded and contracted capsule 5 will be translated into rotary movement of the shafts 26 and 11 and that the ratio of the rotary movements thereof will be determined by the gear ratios of the segment 38 and pinion 39. Means for preventing erratic movements of the pointer shafts, as from shaking or jarring of the instrument, comprises a light spring 45, the lower end of which is fixed to the bracket 14 and the upper end to an arm 46 which projects from the sleeve 27 on shaft 26. It will thus be clear that the large hand 10 will rotate at a higher angular rate than the smaller hand 35.

In accordance with the invention graduated scales are provided for registering the movements of the pointers 10 and 35 in terms of altitude in feet. As embodied, a circular face plate 50 is centrally apertured at 51 to fit about the projecting end of the shaft 11, said plate being seated firmly against the forward face of the main bracket 2 and held there by set screws 53 or other suitable means. A small diameter dial 55 is provided for registering movements of the pointer 35. Said dial 55 is apertured at 56 to fit about the projecting end of bushing 31 of shaft 26 and the face plate 50 is apertured at 57 loosely to surround the dial 55 which thus lies in the same plane as the face plate and against the face of the main bracket 2.

Figure 3:
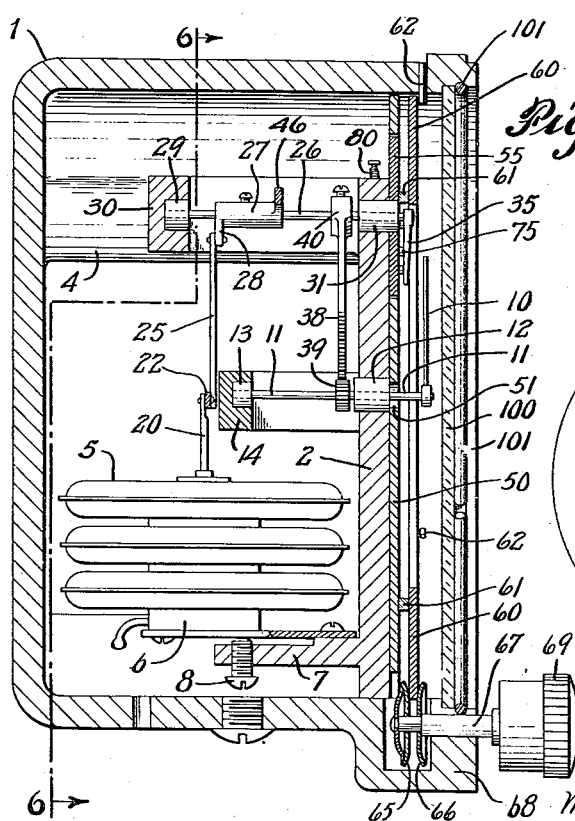
Fig. 3 is an enlarged vertical section on line 3—3 of Fig. 1.
Figure 5:
Fig. 5 is a section on line 5—5 of Fig. 4.
Figure 4:
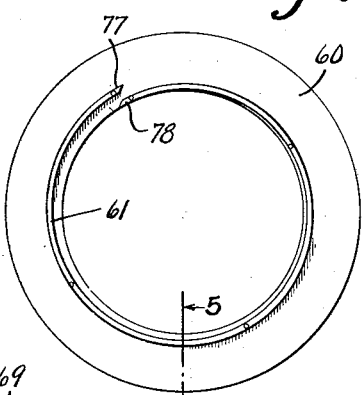
Fig. 4 is a rear plan detail of the larger dial showing the cam track thereon.

The embodied means for registering the greater movements of the hand 10 comprises a graduated dial or ring 60 which is mounted parallel to and in front of the face plate 50 and spaced therefrom by the cam track 61 which is riveted to and projects from the inner or rear face of dial 60 for the purpose hereinafter described. The ring 60 is rotatively mounted within the casing 2 and held in vertical alignment in its rotative path by a plurality of pins 62 projecting inwardly from the casing 2 in front of the ring and by light contact of cam 61 against the face plate 50. As will be clear from Fig. 3 the external diameter of the ring dial 60 is substantially equal to that of the face plate 50, while the interior diameter forms an opening sufficiently large to clear the lower half of the smaller dial 55 as shown in Fig. 1. The front face of dial 60 is suitably graduated in angular sub-divisions and as shown is adapted to indicate changes in altitude over a range of 3000 ft. for one complete revolution of the hand 10. A portion of the lower exposed segment of the smaller dial 55 is angularly graduated to show a total range of 9000 ft., each sub-division being for 3000 ft. and thus equal to one complete revolution of the larger hand 10. Thus it will be clear that the smaller dial 55 with hand 35 will serve to register the gross altitude changes and thereby indicate automatically to the observer the 3000 ft. stratum within which minute changes are indicated by the hand 10 on dial 60.

In accordance with the invention means are provided for imparting arbitrary settings to the dial 60 so as automatically to compensate for barometric pressure variations and for the differences in altitude between the point of take-off and the point of intended landing or other significant points with which the flight may be concerned. Moreover, the invention provides means for automatically communicating such arbitrary movements or correction settings to the smaller dial 55 so that any setting of the larger dial will automatically be communicated to the smaller in the proper ratio. For the purpose of setting the larger dial, same is rotatably and frictionally supported by a friction clutch comprising the flared plates 65 and 66 on the manually turnable knob shaft 67 which is mounted in the boss 68 at the bottom of the casing 1. A suitable knob 69 is provided for turning shaft 67 and as will be clear the motion thereof is transmitted to dial 60.

Figure 2:
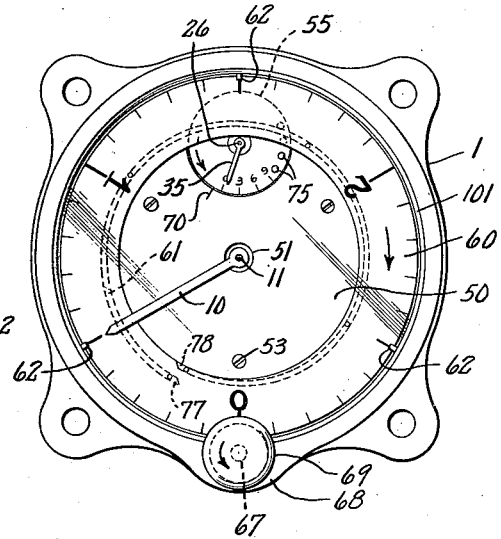
Fig. 2 is a similar view showing a different setting of the dials.

For example, as shown in Figs. 1 and 2, counter-clockwise rotation of knob 69 turns dial 60 clockwise. Fig. 2 shows an arbitrary setting of 1500 ft. has been imparted to the dial 60. Such a setting would be made when the airport at which landing was intended to be made had an actual altitude of 1500 ft. above sea level. The position of the hand 10 in Fig. 2 thus indicates to the pilot that the plane is flying at an elevation of 500 ft. above the airport, although the plane is actually flying at an elevation of 2000 ft. above sea level. It will also be noted in Fig. 2 that the smaller dial 55 has been turned from the register point 70 by an amount corresponding to the arbitrary setting of 1500 ft. on the larger dial 60. Thus the pilot by glancing at the arrow 35 can instantly evaluate his altitude above the airport as 500 ft.

In accordance with the invention the arbitrary setting imparted to the dial 60 is transferred in the proper ratio to the dial 55 by means which are simple, positive and essentially fool proof. For this purpose the front face of the dial 55 is provided with a series of pins 75ª, 75ᵇ, 75ᶜ, and 75ᵈ, which are spaced angularly from each other distances corresponding to the graduations on the dial. The rear face of dial 60, as previously mentioned, is provided with a cam track 61 which projects rearwardly into the space between dial 60 and the face plate 50 and is disposed to co-operate with the pins 75 on dial 55. Said cam track 61 is laid out as a progressive spiral of one revolution, the space between the outer end 77 and the inner end 78 being equal to the distance between any pair of the pins 75. In the zero or starting position of the dials, indicated in Fig. 1, the uppermost pin 75ª thus lies against the outside perimeter of the cam track and near the inner end 78 thereof. Rotation of the dial 60 by means of the knob 69 thus forces the pin upwardly so that, in the position of Fig. 2, the uppermost pin has been moved by the cam track a distance equal to one-half that of the space between the pins, i. e., a distance of 1500 ft. as represented on the small scale of dial 55. Other arbitrary movements of the dial 60 in either direction will thus set off a corresponding movement on the small dial 55. In cases where the arbitrary setting on the larger dial exceeds a complete revolution (i. e. 3000 ft.), the next pin 75ᵇ in the series will be picked up by the end 78 of the cam track and thereafter the cam will act upon said second pin for the next revolution of the dial 60 and so on.

It will be noted that the ends of the spiral cam track 61 are beveled so as easily to initiate positioning thereof with respect to the pins 75. Moreover the outer end 77 of the cam track overlaps the inner end 78 thereof so that in shifting from one pin to the next there will never be any slippage or dislocation. That is, the second pin 75ᵇ will be picked up by the inner end 78 of the cam track before the outer end 77 has cleared the uppermost pin 75ª.

Means are provided for causing the pins 75 to bear against the outer perimeter of the cam track 61 during rotation thereof. For this purpose a tension spring 80 is fixed at 81 on the main bracket 2 and its opposite end is attached to an eccentric pin 82 on the rear face of the dial 55. Thus the normal tendency of the spring 80 is to urge dial 55 to rotate in counter-clockwise direction (Fig. 6) and thus force the appropriate pin 75 to bear against the outer edge or perimeter of the cam track.

The invention also provides means for guarding against mis-alignment of the pin 75 and cam track 61 due to an inadvertent turning of the dial 60 in the wrong direction. This incorrect turning is apt to be done by the user especially when the dials are near or at their zero setting. From Fig. 1 it will be noted that rearward or counter-clockwise turning of dial 60 would cause the uppermost pin 75ª to slip past the inner end 78 of the cam track and thereafter the normal tendency would be to spin or turn dial 55 in clockwise direction (Fig. 1) under the influence of the spring 80 and there would be nothing to prevent it from slipping away from any contact with the cam track. In accordance with the invention such incorrect turning of the dial 55 is counteracted by means of the spring 80. As shown (Fig. 6), the spring 80 lies across the upper corner of the bracket member 30. Ordinarily as hereinabove explained, the pull of the spring 80 is horizontal. However, when the dials 60 and 55 are turned in the wrong direction from the zero point (counter-clockwise in Fig. 6), the pin 82 will drop below the level of the upper edge of bracket 30, thereby causing spring 80 to bend about the upper inner corner C of said bracket 30, i. e. into the position shown in Fig. 6. This will effectively change the direction of pull of that portion of the spring 80 between the pin 82 and the corner C, imparting a component of turning thereto which will oppose the counter-clockwise movement in Fig. 6 and also be opposite to the normal direction of pull of the spring 80. Consequently, I provide a flexible or resilient limitation against turning of the dials in the wrong direction from the zero point and thereby prevent mis-alignment of the pins 75 on the cam track 61 as previously explained.

The invention in its broader aspects is not limited to the specific mechanisms shown and described but departures may be made therefrom within the scope of the accompanying claims without departing from the principles of the invention and without sacrificing its chief advantages.

What I claim is:

1. In an altimeter in combination a rotatable dial for registering small changes in altitude, a second rotatable dial for registering gross divisions of altitude, means for arbitrarily turning said first dial to apply selected factors to the altitude registrations thereof, the second dial being in a plane parallel to and spaced from that of the first dial and rotatable on an axis eccentric to that of the first dial, and a cam movable with the first dial, means on the second dial engaging said cam to turn said second dial an amount proportionate to the turning of the first dial.

2. In an altimeter in combination a rotatable graduated dial for registering small changes in altitude, a second rotatable graduated dial for registering gross divisions of altitude, the second dial being in a plane parallel to and spaced from that of the first dial and rotatable on an axis eccentric to that of the first dial, means for arbitrarily turning said first dial to apply selected factors to the altitude registrations thereof, a spiral cam track on that surface of the first dial adjacent the second dial, cam engaging means on the second dial for rotating same as the first dial is rotated, said cam being of such configuration that the dials are turned in the same proportion as the graduations of one dial bear to the graduations of the other.

3. In an altimeter in combination a rotatable graduated dial for registering small changes in altitude, a second rotatable graduated dial for registering gross divisions of altitude, the second dial being in a plane parallel to and spaced from that of the first dial and rotatable on an axis eccentric to that of the first dial, means for arbitrarily turning said first dial to apply selected factors to the altitude registrations thereof, a spiral cam track on that surface of the first dial adjacent the second dial, cam engaging means comprising spaced pins on the second dial for rotating same as the first dial is rotated, said cam being of such configuration that the dials are turned in the same proportion as the graduations of one dial bear to the graduations of the other.

4. In an altimeter in combination a rotatable graduated annular dial for registering small changes in altitude, a second rotatable graduated disc-shaped dial for registering gross divisions of altitude, the second dial being in a plane parallel to and spaced from that of the first dial and rotatable on an axis eccentric to that of the first dial, means for arbitrarily turning said first dial to apply selected factors to the altitude registrations thereof, a spiral cam track on that surface of the first dial adjacent the second dial, cam engaging means on the second dial for rotating same as the first dial is rotated, said cam being of such configuration that the dials are turned in the same proportion as the graduations of one dial bear to the graduations of the other, the graduations on the second dial being viewable through the annular opening of the first dial.

5. In an altimeter in combination a rotatable graduated dial for registering small changes in altitude, a second rotatable graduated dial for registering gross divisions of altitude, the second dial being in a plane parallel to and spaced from that of the first dial and rotatable on an axis eccentric to that of the first dial, means for arbitrarily turning said first dial to apply selected factors to the altitude registrations thereof, a spiral cam track on that surface of the first dial adjacent the second dial, cam engaging means on the second dial for rotating same as the first dial is rotated, said cam being of such configuration that the dials are turned in the same proportion as the graduations of one dial bear to the graduations of the other, and resilient means for opposing turning of the second dial in one direction.

ADOLF URFER.